US00RE37989E

(19) United States
(12) Reissued Patent
Pedersen et al.

(10) Patent Number: US RE37,989 E
(45) **Date of Reissued Patent: *Feb. 18, 2003**

(54) PRESSURE RELIEF VALVE FOR PRESSURE EQUALIZATION BETWEEN A CLOSED SPACE AND THE SURROUNDING ATMOSPHERE

(75) Inventors: Hans-Henrick Raagaard Pedersen, Lynge (DK); Anders Ib Damborg Petersen, Lynge (DK)

(73) Assignee: Emil Aarestrup Sorensen, London (GB)

( * ) Notice: This patent issued on a continued prosecution application filed under 37 CFR 1.53(d), and is subject to the twenty year patent term provisions of 35 U.S.C. 154(a)(2).

(21) Appl. No.: 09/754,817

(22) PCT Filed: May 31, 1995

(86) PCT No.: PCT/DK95/00212

§ 371 (c)(1),
(2), (4) Date: Dec. 30, 1996

(87) PCT Pub. No.: WO96/01962

PCT Pub. Date: Jan. 25, 1996

Related U.S. Patent Documents

Reissue of:
(64) Patent No.: 5,873,384
Issued: Feb. 23, 1999
Appl. No.: 08/765,641
Filed: Dec. 30, 1996

(30) Foreign Application Priority Data

Jul. 8, 1994 (DK) ..... 817/94

(51) Int. Cl.[7] ..... F61K 17/12

(52) U.S. Cl. ..... 137/471; 137/493.8; 137/533.21; 137/534

(58) Field of Search ..... 137/471, 493.8, 137/533.21, 534

(56) References Cited

U.S. PATENT DOCUMENTS

| | | | |
|---|---|---|---|
| 253,622 | A | 4/1882 | Pearson |
| 5,060,688 | A | 10/1991 | Sorensen |
| 6,029,706 | A | 2/2000 | Joo |

FOREIGN PATENT DOCUMENTS

| | | |
|---|---|---|
| DE | 63490 | 9/1891 |
| KR | 0125817 | 6/1998 |

*Primary Examiner*—Gerald A. Michalsky
(74) *Attorney, Agent, or Firm*—Garvey, Smith, Nehrbass & Doody, LLC; Charles C. Garvey, Jr.; Brett A. North

(57) ABSTRACT

A pressure relief valve includes a valve housing and a drop-shaped body with a conical valve surface that cooperates with a conical valve seat at an upwardly directed blow-off opening of the valve housing. The drop-shaped body is connected to a lifting disc in the housing. The inner configuration of the housing provides an annular passage around the lifting disc which is smaller in area when the lifting disc (and drop-shaped body) is in its uppermost, fully open positioning as compared to its lowermost, closed positioning.

37 Claims, 3 Drawing Sheets

PRESSURE RELIEF VALVE FOR PRESSURE EQUALIZATION BETWEEN A CLOSED SPACE AND THE SURROUNDING ATMOSPHERE

Matter enclosed in heavy brackets [ ] appears in the original patent but forms no part of this reissue specification; matter printed in italics indicates the additions made by reissue.

BACKGROUND OF THE INVENTION

1. Field of the Invention

The invention relates to a pressure relief valve for pressure equalization between a closed space and the surrounding atmosphere, and particularly to such pressure relief valves used in tankers for oil products and chemicals. In and in the following explanation and description this field of use will be taken as point of departure, but it will be understood that the same principles will be equally applicable to other fields of use, e.g., for stationary storage tanks or for rolling transportation tanks for liquid petroleum products or chemicals.

2. Prior Art

When a certain volumetric quantity of product per time unit, e.g., measured in $m^3/h$, is loaded into a tank, the associated pressure relief valve is to be opened when the pressure in the tank has risen above a pre-set closing pressure, and thereafter a quantity of gas is to be blown off per time unit corresponding to the quantity of product loaded per time unit with an addition, where applicable, for evaporation from the liquid surface in the tank. The blow-off quantity per time unit depends on the flow resistance of the valve—and thereby on the lifting height of the valve—and on the pressure in the tank. The maximum blow-off quantity per time unit—with deduction of any addition for evaporation—which is obtainable without the pressure in the tank exceeding a certain safety limit is referred to as the capacity of the pressure relief valve, which is thus a measure of the maximum permissible loading quantity per time unit (e.g. $m^3/h$).

The volumetric quantity of product loaded per time unit is referred to as the loading rate (e.g. $m^3/h$), and the volumetric quantity of gas blown off per time unit as the blow-off rate (likewise e.g. $m^3/h$). The latter is not to be confused with the blow-off velocity, which means the linear velocity at which the gas is blown off through the valve opening, e.g., measured in m/sec..

More particularly, the invention relates to a pressure relief valve which includes a valve housing provided at its top with a blow-off opening formed with an upwardly-facing, substantially conical valve seat, a drop-shaped body suitable for concentrating a flow of gas impinging on its underside to an upwardly-directed jet, a substantially conical valve face for closing against the valve seat being formed on the downwardly-facing portion of the rounded surface of the drop-shaped body, which thereby constitutes a valve body, and a lifting disc connected with the drop-shaped body and located at a lower level within the housing, the lifting disc having an outer diameter greater than the inner diameter of the valve seat, stop means for defining a fully open position of the valve, the lifting disc being surrounded by a free passage slot in the closed position of the valve.

Such a pressure relief valve is disclosed and claimed in international patent application PCT/DK90/00050, published on 07.09.90 under No. WO 90/10168.

Due to the arrangement described, the lifting pressure is shifted at the initiation of the opening from the smaller area of the underside of the drop-shaped member within the valve seat to the larger area of the lifting disc, whereby a higher lifting speed is obtained.

In the embodiment disclosed in WO 90/10168, the valve housing has an inner configuration such that the free passage area around the lifting disc is increased when the drop-shaped body and the lifting disc are lifted, whereby also at increasing blow-off quantity, a lower pressure is obtained than would otherwise be possible, until the valve approaches its fully open condition.

It has been found, however, that in some circumstances, depending, i.e., on the type of product to be loaded and the facilities and practices of the loading station, situations may occur, particularly at relatively low rates of loading and correspondingly low flow-off rates from the tank being loaded, where the flow-control element consisting of the drop-shaped valve body and the lifting disc will be subjected to fluctuations of the rate of gas flow caused, e.g., by turbulence or non-uniform distribution of the flow. The resulting vibratory movement of the flow-control element will act back on the rate of flow, and thereby a reciprocal-amplifying effect may be initiated which may cause the valve to vacillate forth and back between the fully open and the closed position. Thereby the valve may be subjected to a rapid succession of heavy clashes of metal against metal, which is in itself undesirable for mechanical reasons, and besides may produce a loud noise, which may even be amplified by the tank wall as a reverberator.

SUMMARY OF THE INVENTION

It is the object of the invention to remedy or reduce this drawback, and according to the invention this is achieved by providing the valve housing with an inner configuration such that the free passage area around the lifting disc is decreased when the drop-shaped body and the lifting disc are lifted from the closed to the fully open position.

By this arrangement the high speed of opening of the valve upon reaching the opening pressure is maintained, but once the valve has been opened, the blow-off pressure acting on the blow-off control element will over a wide range be much less dependent on the blow-off rate and therefore less sensitive to fluctuations of the rate of gas flow, so that vacillation of the valve forth and back between the fully open and the closed position may be avoided or at least will be softened and slowed down.

BRIEF DESCRIPTION OF THE DRAWINGS

The invention will now be described in more detail with reference to the accompanying drawings, in which.

DETAILED DESCRIPTION OF THE PREFERRED EMBODIMENT

Figure 1:
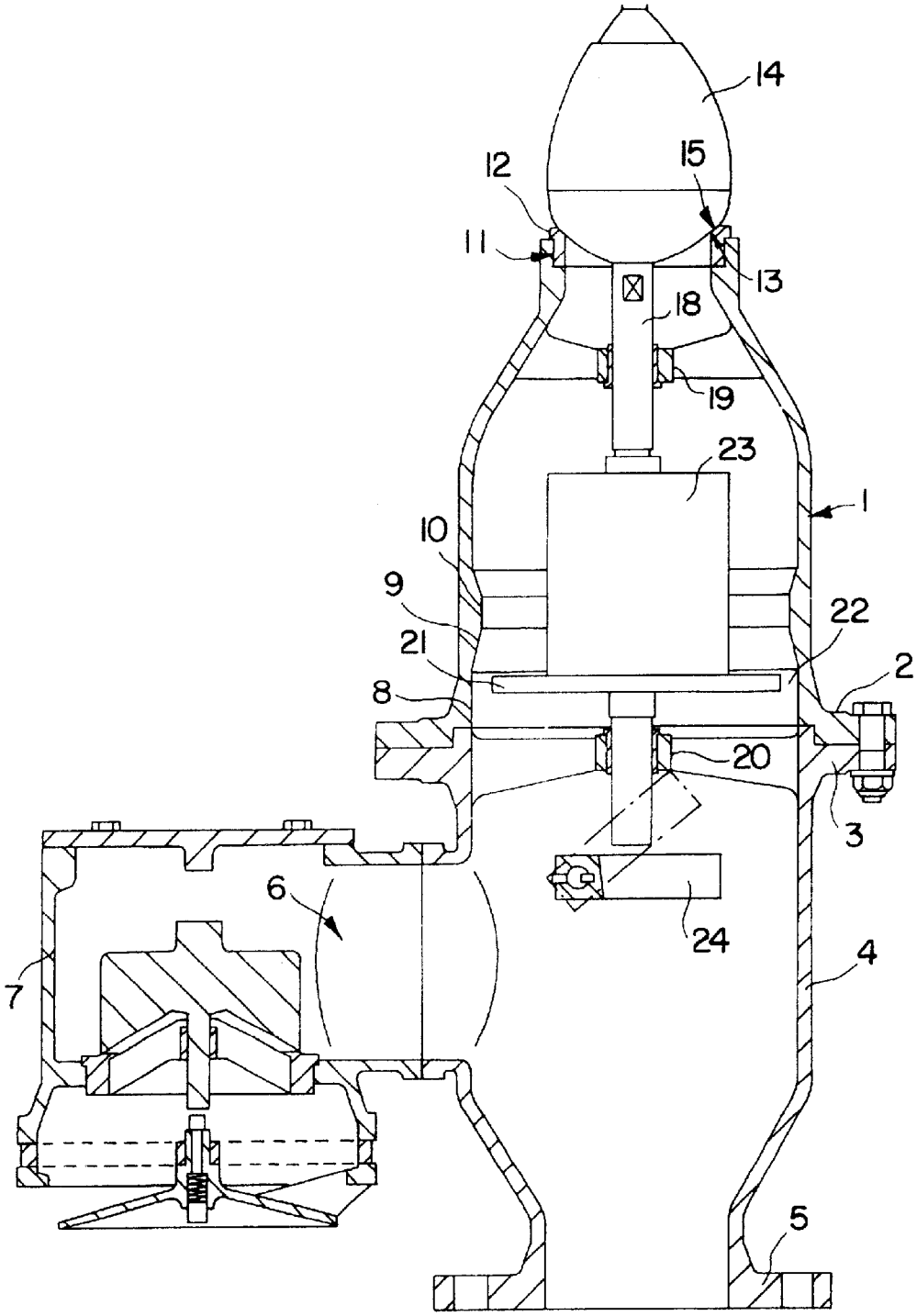
FIG. 1 shows a side view, partially sectioned, of a pressure relief valve according to a preferred embodiment of the invention, the valve being illustrated in its closed position.
Figure 2:
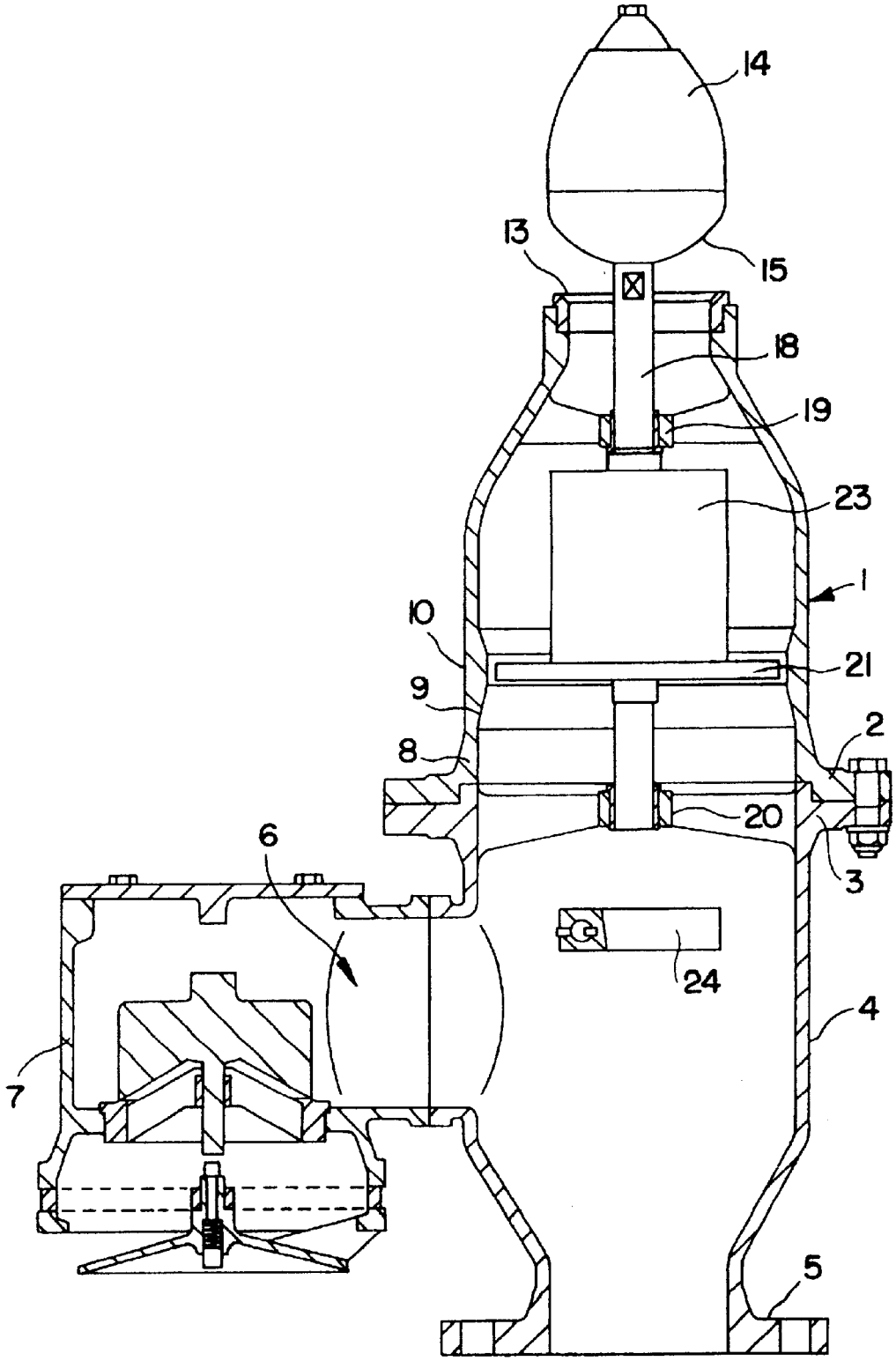
FIG. 2 is a corresponding illustration of the valve in its fully open position and, FIGS. 3 and 4 are graphs representing the tank pressure and the blow-off velocity, respectively, as plotted against the volumetric blow-off quantity per time unit, as determined for a prototype of a pressure relief valve constructed in accordance with the invention.

In the drawings, 1 is a vertically oriented valve housing, which at its lower end has a flange 2 which is bolted to a flange 3 of a tubular socket 4 constructed at its lower end with a flange 5 that can be bolted to a pressure relief outlet of an oil tank or to the upper end of a pressure relief pipe connected to one or more tank compartments. In the embodiment shown, the socket 4 has a lateral opening 6 to which a vacuum relief valve 7 is connected. This valve will not be described in detail, because it does not form part of the invention.

At its lower end the valve housing has a cylindrical wall portion 8 which is an upward direction is followed by a converging wall portion 9 and thereafter a cylindrical wall portion 10. At its top the valve housing is terminated by a blow-off opening 11.

In the blow-off opening there is mounted a mouth ring 12 at the inner side of which a conical valve seat 13 is formed. In the blow-off opening 11 there is arranged a drop-shaped body 14 on the underside of which a conical valve surface 15 is formed which in the closed condition of the valve sealingly engages the valve seat 13. For improving the tightness, an annular elastic gasket may be arranged on the inner side of the mouth ring for engaging the underside of the drop-shaped body 14, as disclosed in WO 90/10168.

A stem 18 is connected to the drop-shaped body and extends down through the housing where it is guided *and supported* by an upper stem guide *and stop* 19 in the valve housing and a lower stem guide 20 in the socket 4. The stem 18 carries a lifting disc 21 which in the closed position of the valve is located in the interior of the cylindrical wall portion 8 and has a slightly smaller diameter than the latter so that a free passage slot 22 is formed around the lifting disc. Under the lower end of the stem 18 there is mounted a rocking lever 24 for use in check-lift of the valve.

The stem 18 carries a weighting load 23 between the upper stem guide 19 and the lifting disc 21. Thus, the structure, referred to herein as the flow-off controlling member, including the drop-shaped body 14, the stem 18, the weighting load 23, and the lifting disc 21, is subjected to a downwardly directed closing force equal to the total weight of all parts of the structure. The weighting load 23 may be supplemented or replaced by a compressional spring, as disclosed in WO 90/10168.

If a pressure in excess of that of the atmosphere comes up in the tank, then, owing to the leakage through the slot 22, this pressure will propagate to the space above the lifting disc 21, and this will therefore be subjected to the same pressure from above and from below. A lifting force is therefore produced solely by the action of the excess pressure on the underside of the drop-shaped body. This lifting force is equal to the excess pressure multiplied by the cross-sectional area of the blow-off opening inside the valve seat.

When the lifting force rises above the previously mentioned closing force, the valve is opened. When the blow-off commences at the opening of the valve, the pressure on the upper side of the lifting disc drops, and the net value of the lifting force becomes equal to the tank pressure multiplied by the area of the lifting disc. Since this is larger than the area of the blow-off opening, the lifting force is augmented, and thereby the lifting speed is increased.

When the lifting disc is thus lifted, the passage area around the disc, which controls the flow resistance of the valve, will decrease owing to the convergency of the wall portion 9.

Figure 3:
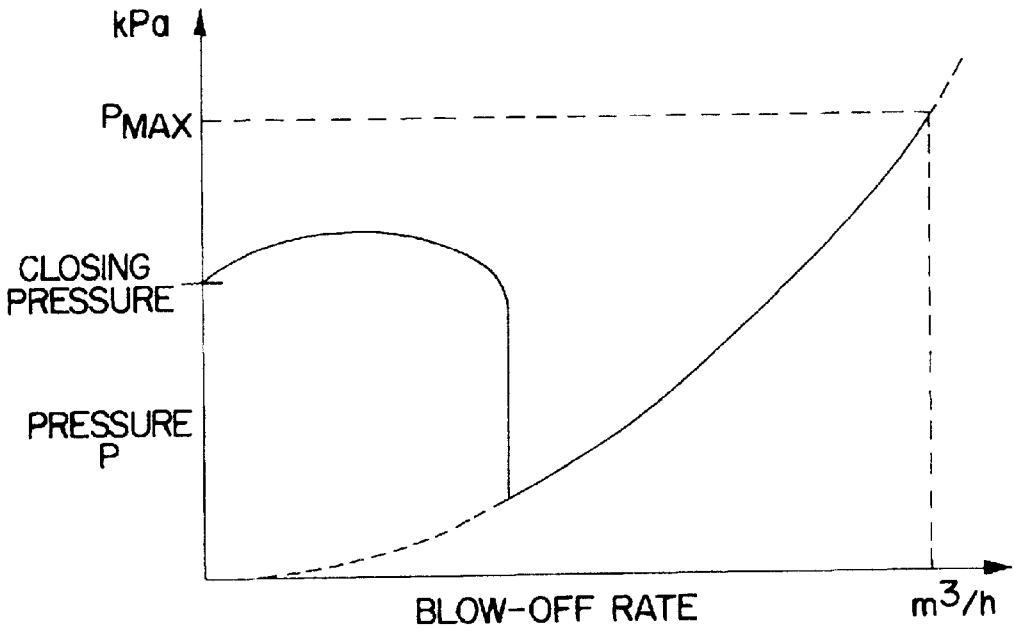

Since the passage area around the lifting disc determines the flow resistance of the valve, and thereby the pressure drop across the valve for a given blow-off rate, a definite relationship will exist between the tank pressure and the blow-off rate, as illustrated in FIG. 3, the tank pressure being equal to the atmospheric pressure plus the pressure drop across the valve, which is practically the same as the pressure drop in the passage area around the lifting disc.

Figure 4:
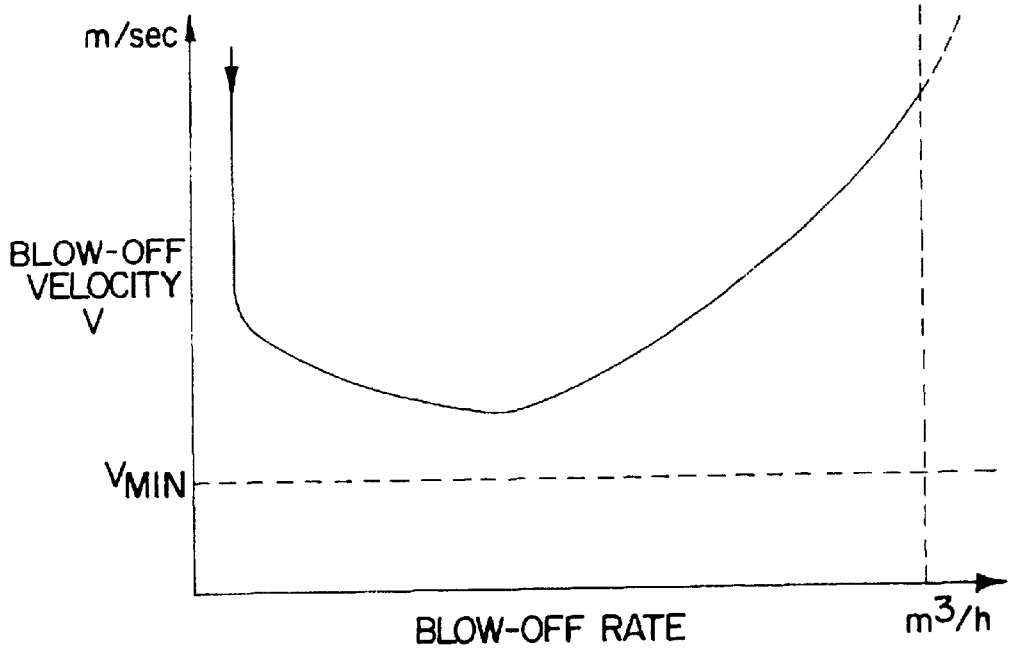

The velocity of the blow-off gas is determined by the blow-off rate and the passage area around the lifting disc and can therefore also be determined, as illustrated in FIG. 4.

FIG. 3 illustrates that at blow-off rates varying from zero up to a certain boundary value, the pressure varies along a flat curve first upwards and then back to the closing pressure value. When the boundary value is exceeded, the pressure drops abruptly to the same value as it would have had if the valve had been fully open from the start, as indicated by the dotted graph portion. At continued increase of the blow-off rate the valve remains fully open, and the tank pressure increases further, and when it assumes the value $P_{max}$, the blow-off rate has reached the maximum permissible value, which is referred to as the capacity of the pressure relief valve. If, during loading of the tank, the loading rate, with deduction for evaporation, if any, is kept below the capacity of the pressure relief valve, the tank is, within a substantial safety margin, protected against explosion.

The noted boundary value of the blow-off rate subdivides the available range of blow-off rates into a lower range in which the influence of the blow-off rate on the tank pressure and thereby on the lifting force acting on the valve is very small, and an upper range in which the pressure relief valve is constantly in its fully open position.

In either range the risk of vacillation of the valve forth and back between the fully open and the closed position as a consequence of accidental fluctuations of the rate of gas flow will be practically eliminated.

As illustrated in FIG. 4, the blow-off velocity of gas through the valve will be so high at very low blow-off rates that it is beyond illustration. At increasing blow-off rates it decreases to a minimum value at or about the boundary value of the blow-off rate. The dimensioning should be such that this minimum value is well above the minimum value $V_{min}$ prescribed for high velocity valves, e.g. 30 m/sec.

We claim:

1. A pressure relief valve for pressure equalization between a closed space and the surrounding atmosphere, comprising a valve housing provided at its top with a blow-off opening formed with an upwardly facing substantially conical valve seat, a drop-shaped body suitable for concentrating a flow of gas impinging on its underside to an upwardly directed jet, a substantially conical valve face for closing against said valve seat being formed on the downwardly facing portion of the rounded surface of said drop-shaped body, which thereby constitutes a valve body, and a lifting disc connected with said drop-shaped body and located at a lower level within the housing, said lifting disc having an outer diameter greater than the inner diameter of said valve seat, and stop means for defining a fully open position of the valve, the lifting disc being surrounded by a free passage slot in the fully closed position of the valve, said valve housing having an inner configuration such that the free passage area around the lifting disc is decreased when the drop-shaped body and the lifting disc are lifted from the fully closed to the fully open position.

*2. The pressure relief valve of claim 1 further comprising a valve stem that connects to the drop shaped body and comprises part of the valve body.*

*3. The pressure relief valve of claim 2 wherein the housing has a pair of stem guides that support the stem.*

*4. The pressure relief valve of claim 3 wherein the stem has an upper end portion that supports the drop shaped body.*

*5. The pressure relief valve of claim 3 wherein the stem carries a weighted load.*

*6. The pressure relief valve of claim 5 wherein the weighted load is positioned on the stem between the drop shaped body and the disc.*

*7. The pressure relief valve of claim 3 wherein the stem guides include an upper stem guide positioned next to the blow off opening and a lower stem guide positioned below the lifting disc.*

*8. The pressure relief valve of claim 1 further comprising a weighted load member attached to the drop shaped body and the lifting disc for movement therewith.*

*9. The pressure relief valve of claim 1 wherein the valve housing has at least one guide that guides travel of the valve body.*

*10. The pressure relief valve of claim 9 wherein the guide is positioned below the lifting disc.*

*11. A pressure relief valve for pressure equalization between a closed space and the surrounding atmosphere, comprising:*

*a) a valve housing having a top, an upper level, and a lower level, the housing being provided at its top with a blow-off opening formed with an upwardly facing valve seat;*

*b) a valve body that includes a tapered body suitable for concentrating a flow of gas impinging on its underside to an upwardly directed jet, said tapered body having a downwardly facing portion;*

*c) a valve face for closing against said valve seat, the valve face being formed on the downwardly facing portion of said tapered body;*

*d) the valve body including a lifting disc connected to said tapered body and located within the lower level of the housing, said lifting disc and tapered body being movable between fully open and fully closed positions, said lifting disk having an outer diameter greater than the inner diameter of said valve seat; and*

*e) a stop that defines a fully open position of the tapered body and lifting disk;*

*f) the lifting disc being surrounded by a passage area in the fully closed position; and*

*g) said valve housing having an inner configuration such that the passage area around the lifting disc is decreased when the tapered body and the lifting disc are lifted from the fully closed to the fully open position.*

*12. The pressure relief valve of claim 11 wherein the valve housing tapers to a smaller cross sectional area at the blow off opening.*

*13. The pressure relief valve of claim 11 wherein the tapered body has a conical section.*

*14. The pressure relief valve of claim 13 wherein the valve housing has at least one guide that guides travel of the valve body.*

*15. The pressure relief valve of claim 14 wherein the guide is positioned below the lifting disc.*

*16. The pressure relief valve of claim 14 wherein there are a pair of guides.*

*17. The pressure relief valve of claim 16 wherein the pair of stem guides include an upper stem guide positioned next to the blow off opening and a lower stem guide positioned below the lifting disc.*

*18. The pressure relief valve of claim 11 further comprising a valve stem that comprises part of the valve body.*

*19. The pressure relief valve of claim 18 further comprising a weighted load member attached to the stem.*

*20. The pressure relief valve of claim 19 wherein the stem has an upper end that supports the tapered body.*

*21. The pressure relief valve of claim 20 wherein the weighted load is positioned in between the tapered body and the lifting disc.*

*22. A pressure relief valve for pressure equalization between a closed space and the surrounding atmosphere, comprising:*

*a) a valve housing having upper and lower end portions, provided at its upper end portion with a blow-off opening formed with a valve seat;*

*b) a tapered body suitable for concentrating a flow of gas impinging on its underside to an upwardly directed jet;*

*c) a valve face for closing against said valve seat, said face being formed on the downwardly facing portion of the tapered body;*

*d) an elongated valve stem having upper and lower end portions, wherein the tapered body is connected to the stem at the upper end portion of the valve stem, the stem being movably attached to the valve housing and movable between an upper fully open position and a lower fully closed position;*

*e) a lifting disc connected to the lower end portion of the valve stem and located at the lower end portion of the housing, said lifting disc having an outer diameter greater than the inner diameter of the valve seat;*

*f) a stop that limits upward movement of the stem to define the fully open position of the valve stem, the lifting disc being surrounded by a passage area in the fully closed position of the valve stem; and*

*g) said valve housing having an inner configuration such that the passage area around the lifting disc is decreased when the tapered body, stem, and lifting disc are lifted together from the fully closed to the fully open position.*

*23. The pressure relief valve of claim 22 further comprising a weighted load member attached to the tapered body and lifting disc for movement therewith.*

*24. The pressure relief valve of claim 22 wherein the valve housing has at least one stem guide that supports the stem, positioned below the lifting disc.*

*25. The pressure relief valve of claim 22 wherein the wherein the valve housing has at least one guide that guides travel of the tapered body.*

*26. The pressure relief valve of claim 22 wherein there are a pair of stem guides that support the stem.*

*27. The pressure relief valve of claim 26 wherein the stem guides include an upper stem guide positioned next to the blow off opening and a lower stem guide positioned below the lifting disc.*

*28. The pressure relief valve of claim 27 wherein the housing has a generally cylindrically shaped portion at the lower end portion of the housing and the lifting disc is positioned next to said cylindrically shaped portion when the lifting disc is the fully closed position.*

*29. The pressure relief valve of claim 28 wherein the housing has a frustoconically shaped portion above the cylindrically shaped portion.*

*30. The pressure relief valve of claim 22 wherein the stem has an upper end portion that supports the tapered body.*

*31. The pressure relief valve of claim 22 wherein the stem carries a weighted load.*

*32. The pressure relief valve of claim 31 wherein the weighted load is positioned in between the tapered body and the lifting disc.*

*33. The pressure relief valve of claim 22 further comprising a valve stem guide attached to the lower end portion of the valve housing.*

*34. A pressure relief valve for pressure equalization between a closed space and the surrounding atmosphere, comprising:*

*a) a valve housing having an upper end portion and a lower end portion;*

*b) an opening formed at the upper end portion of the valve housing, the opening having a valve seat;*

*c) a valving member that is movably supported by the valve housing between fully opened and fully closed positions, the valving member including an elongated stem, a tapered body suitable for concentrating a flow of gas impinging on its underside to an upwardly directed jet, and a lifting disc;*

*d) a valve face for closing against said valve seat, the valve face formed on the tapered body;*

*e) wherein the lifting disc is connected to the stem, the lifting disc being located at the lower end portion of the housing, said lifting disc having an outer diameter greater that the inner diameter of the valve seat;*

*f) a stop that limits travel of the valving member to define a fully open position of the valving member, the lifting disc being surrounded by a passage area in the fully closed position of the valving member; and*

*g) the valve housing having an inner configuration such that the passage area around the lifting disc is decreased when the valving member is lifted from the fully closed to the fully open position.*

*35. The pressure relief valve of claim 34 wherein the valve housing has separate upper and lower sections that are removably fastened together.*

*36. The pressure relief valve of claim 35 wherein there are two spaced apart stem guides, one attached to the upper section of the valve housing and one attached to the lower section of the valve housing.*

*37. The pressure relief valve apparatus of claim 34 further comprising a pair of spaced apart valve guide stems, at least one of which is positioned below the lifting disc.*

* * * * *